United States Patent

Lipp

[15] 3,643,228

[45] Feb. 15, 1972

[54] HIGH-DENSITY STORAGE AND RETRIEVAL SYSTEM

[72] Inventor: James P. Lipp, Oklahoma City, Okla.

[73] Assignee: Honeywell Information Systems Inc.

[22] Filed: Oct. 27, 1969

[21] Appl. No.: 869,698

[52] U.S. Cl. ....................................340/172.5, 340/174.1

[51] Int. Cl. ....................................................G11b 5/00

[58] Field of Search........................340/174, 172.5, 174.1 G

[56] References Cited

UNITED STATES PATENTS 3,226,685 12/1965 Potter et al. ......................340/172.5

3,281,806 10/1966 Lawrence et al. ..................340/174.1

3,374,475 3/1968 Gabor..................................340/174.1

*Primary Examiner*—Paul J. Henon
*Assistant Examiner*—Harvey E. Springborn
*Attorney*—George V. Eltgroth, Edward W. Hughes, Frank L. Neuhauser, Oscar B. Waddell, Joseph B. Forman and George R. Powers

[57] ABSTRACT

A high-density recording and reproducing system in which information is divided into groups of binary digits (bits) with different flux transition patterns recorded in associated storage cells to represent each group of bits and wherein each pattern is recorded and read independently of bits in adjacent cells resulting in reduced pulse crowding effects.

13 Claims, 8 Drawing Figures

INVENTOR
JAMES P. LIPP
BY Warren F. B. Lindsley
ATTORNEY

HIGH-DENSITY STORAGE AND RETRIEVAL SYSTEM

BACKGROUND OF THE INVENTION

The present invention relates generally to the storage and retrieval of information in binary form and is particularly applicable, although not limited, to the storage and retrieval of binary digits (bits) on and from magnetic storage media such as those used in electronic data processing systems.

FIELD OF THE INVENTION

The invention is particularly utilized in high-speed data processing systems wherein information processed is supplied from any one of many types of external sources such as magnetic and thermoplastic recording tapes, magnetic discs, drums, magnetic arrays of thin film, cores, etc., punched cards, documents bearing magnetic ink imprints, optically recognizable coded imprints, machine or hand recorded marks or other sources of electrical data.

In any storage and retrieval system, the primary objective is to accurately record and retrieve the desired information. In modern day electronic data processing systems, however, it is becoming increasingly important to increase the rate at which data may be brought from or sent to an external storage device from the processor of a system which actually performs the computations and manipulations of the data. Additionally, because of the ever increasing volume of data which is required, it is becoming increasingly important to increase the amount of data which can be stored on a given area of a storage medium. This latter feature is commonly referred to as information "packing density" or simply as packing density and is normally expressed in bits per inch , that is, the number of bits which can be stored with respect to an inch of storage medium.

It is known in the art that digital information can be stored on a medium having a magnetizable surface and that information thus stored may be recovered by providing relative movement between the medium and a transducer which detects polarity changes of discrete areas of the medium's surface. The detected pattern of magnetic polarization, or flux reversals as they are commonly called, taken in conjunction with an additional parameter, for example time or position, is indicative of the information stored and retrieved and this pattern is commonly referred to as a code.

Since given storage media, taken in conjunction with the equipment used to record thereon and read therefrom, have given bit packing densities arising from fidelity and resolution capabilities the remaining factor on the amount of data that can be recorded in a given length of storage medium is the code or flux pattern utilized for recording data. Stated in another way, the code which provides the minimum amount of worst case flux density for a given amount of information and resolution is that which will produce the highest practical amount of information storage.

For high-density recording systems, it is usually desirable that the information be self-clocking. In such a system, clock transitions are recorded along with the information pulses in each storage cell and one clock pulse is recorded for each digit or bit of information. Because of the effects of peak shifting, one form of pulse crowding hereinafter explained, any increase in the ratio of information bits to clock pulses with commonly available codes makes clocking difficult and reduces the density for certain combinations of data patterns. If the density of flux transitions is reduced sufficiently to avoid the effects of pulse crowding and frequent clock transitions are retained, the ratio of the resulting density of information to total flux transitions will be reduced.

The present invention utilizes a code which permits a high density of flux transitions per unit of storage capacity with a minimum of pulse crowding effects and an increase in the density of stored information bits. Further, the claimed invention utilizes a code which is independent of the pattern of flux reversals in adjacent cells thereby reducing memory hardware requirements.

DESCRIPTION OF THE PRIOR ART

One prior art system for storing information on magnetic tapes, drums and discs employs self-clocking capabilities requiring no separate timing track or electronic synchronized timing device. With binary 0's recorded by the absence of flux transitions or nonflux reversals and binary 1's as flux reversals, two or more 0's in a row creates a relatively wide space between adjacent flux transitions. This may drastically affect the timing because of the phenomenon called pulse crowding. To correct this condition, the prior art recorded data on the magnetic medium in two modes. One mode is used for recording every pair of bits that includes at least a 1 bit, that is, one digit representing a binary 1. When two consecutive 0's are to be recorded, the prior art switches to a second mode in which the system records the two 0's and the two adjacent bits in such a way that a flux transition is provided for at least one of all pairs of consecutive reversal recording positions. The extra logic to do this mode switching is the price paid for reducing the pulse crowding effect called peak shifting without increasing the recording density or frequency response of the stored information. Additionally, the recorded information in each cell depends upon the binary configuration of bits to be recorded in the next adjacent cell to provide for switching from one mode to another mode.

Another prior art recording system provides a regularly occurring clock flux transition for each group or plurality of bits recorded in a cell. A maximum number of N sequential positions without a flux reversal corresponding to the number of sequential positions between each regularly occurring clock flux transition results in the previously mentioned peak shifting effect when a plurality of 0's are recorded. For example, with a group of 3 bits recorded in each storage cell, a maximum number of three sequential positions without a reversal may occur between adjacent clock flux transitions. With 3 bits recorded in each storage cell between clock flux transitions, a 50 percent increase in recording density is achieved over a recording system employing 1 clock flux transition per bit.

The first prior art system described above requires more hardware for switching between modes and is dependent upon the binary configure to be recorded in each adjacent cell to control the mode switching arrangement and provides only a one-third increase in recording density over a recording system employing one clock transition per data bit. In the second prior art recording system described above, a large number of sequential positions without a reversal is encountered resulting in the peak shifting affects hereinafter defined.

With the invention disclosed and claimed, the self-clocking feature of the recorded data is retained with a decrease in hardware requirements. An increase in the density of the stored information is achieved with a decrease in peak shifting and the recording of information in a given cell (hereafter defined) is kept independent of the flux transition pattern of adjacent cells. An error detection capability is also provided thereby enhancing the reliability of the storage and retrieval system.

SUMMARY OF THE INVENTION

In accordance with the invention claimed, a high-density recording system is provided which eliminates mode switching, is independent of the transition pattern in adjacent cells, provides a 50 percent higher recording density than that of a one clock per one data bit recording ratio, eliminates regular clocking intervals and reduces from three or more to two sequential positions the possibility of data recording without a flux reversal. The recording and reproducing system utilizes a transition recording pattern and apparatus wherein a representation of 3 bits is recorded within a unit of the storage medium herein referred to as a cell. This is accomplished in the illustrated embodiment of the present invention by dividing each cell into four equal parts and recording a flux transition or reversal at one or more of the division points or positions within the cell in accordance with a 3 bit (triplet, ternary or trisection) configuration. The actual combination of bits represented by the flux transitions is indicated by the relative position of the flux transitions within the individual cell.

The present invention, by eliminating the need for clock transitions at regular intervals and particularly between sequential positions which do not contain a flux transition, increases the recording density of useful information. For example, in a 3 bit configurations such as 000, flux transitions are provided at two transition positions within the quadripartite cell containing this configuration. Also, for a bit configuration of 100, a flux transition is omitted at a boundary transition position between adjacent cells and three flux transitions are provided in each of the remaining three transition positions of this cell. In this manner, the number of nonreversal positions sequentially occurring without a flux reversal is reduced from the prior art three positions to the disclosed two positions for a cell employing four flux transition positions. By utilizing the disclosed code employing a cell with four flux transition positions wherein three positions are normally utilized for data, a 50 percent higher recording density is provided over that obtained by a prior art code requiring 1 clock flux transition per data bit flux transition. Also, the self-clocking feature of the recorded data is retained by employing patterns of flux transitions for all bit configurations which provide for a transition at one of two predetermined positions in each cell to allow irregular but frequent occurring transitions for clocking use.

It is, therefore, an object of this invention to provide an improved information recording and reproducing system.

Another object of this invention is to provide an improved system for increasing the amount of information stored and recovered from a storage medium while at the same time decreasing the distance between flux reversals on the storage medium.

A further object of this invention is to provide a new recording code which is independent of the pattern of the information being recorded in adjacent cells.

A still further object of this invention is to provide an improved self-clocking recording code wherein the clock flux transitions are irregularly recorded at a greater frequency and at more optimum intervals than heretofore possible with the same information efficiency.

A still further object of this invention is to provide an improved recording code.

A still further object of this invention is to provide an automatic means of detecting certain unacceptable patterns thereby allowing the readout to be inhibited and a reread instituted.

Further objects and advantages of the present invention will become apparent to those skilled in the art as the description thereof proceeds.

BRIEF DESCRIPTION OF THE DRAWINGS

The present invention may be more readily described by reference to the accompanying drawings in which.

DETAILED DESCRIPTION OF OPERATION

Figure 1:
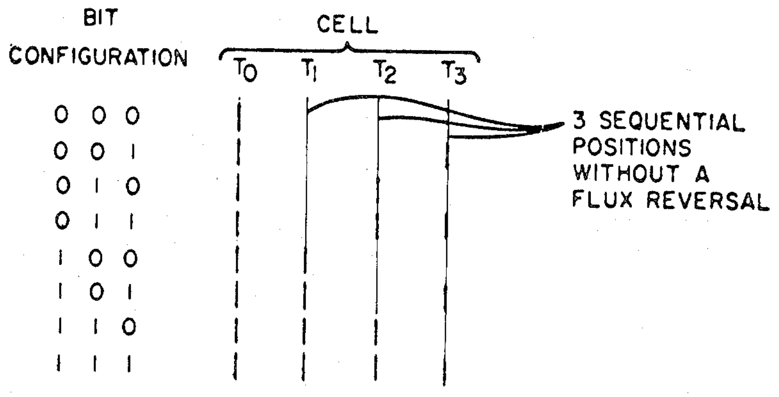
FIG. 1 PRIOR ART
FIG. 1 is a diagram illustrating the manner in which various bit configurations are recorded within a cell area of a storage medium in accordance with a prior art recording system.

FIG. 1 illustrates the manner in which information is stored as a pattern or code on a recording medium in a prior art system. This FIG. particularly illustrates representations of the storage of given bit configurations. Each cell is divided into four equal parts by the lines $T_0$, $T_1$, $T_2$, $T_3$, collectively referred to as T times. These T times designate the subdivisions of the data cell and at these times flux reversals are placed on the storage medium to represent the various bit configurations. Since the sense of magnetic flux polarities are immaterial, only changes are so indicated. For the bit configuration of 000 , three sequential positions without a reversal is encountered resulting in peak shifting effects hereinafter explained.

Figure 2:
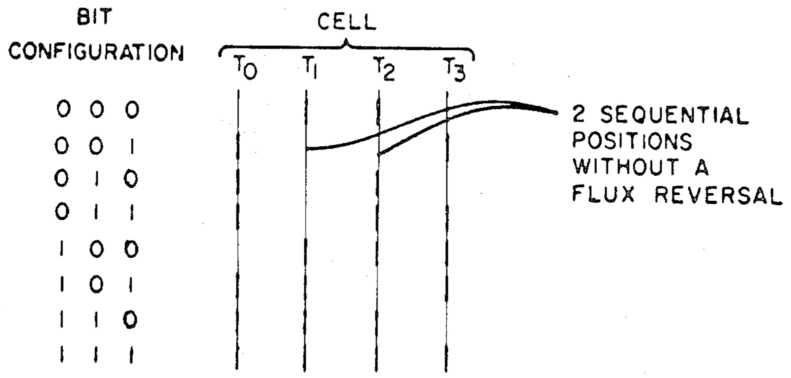
FIG. 2 is a diagram illustrating the manner in which various bit configurations are recorded within a cell area of a storage medium in accordance with the present invention.

In accordance with the provisions of the present code, as illustrated in FIG. 2, a 000 bit configuration is written with a flux transition omitted at the $T_0$ position and flux transitions recorded at $T_1$ and $T_2$ positions of the cell. For a 100 configuration, a flux transition or reversal is omitted at the $T_0$ position with flux transitions recorded at $T_1$, $T_2$ and $T_3$ positions. Thus, the occurrence of three sequential positions without a flux reversal is eliminated. The transition pattern for the 100 bit configuration of FIG. 2 has been changed to eliminate the possibility of three sequential positions without a flux reversal occurring in the event that a 100 bit configuration is followed by a 000 bit configuration. The remaining 3 bit configurations of FIG. 2 are written with transitions or flux reversals at the $T_0$, $T_1$, $T_2$ and $T_3$ positions, as shown.

The claimed code self-synchronizes or self-clocks data read from the storage medium. By self-clocking is meant that flux reversals used to designate data are also used to maintain synchronization within the system. It will be seen from FIG. 1 that, in certain bit configurations such as 000 and 100, the distance between successive flux reversals exceeds a maximum which is believed essential for good self-clocking conditions. Although clocking signals may be received from all four T positions of FIG. 2, in the described embodiment provision is made for providing a flux reversal either at the $T_0$ position or at the $T_2$ position of the cell to properly maintain synchronization during readout of the information from the medium.

With reference to FIG. 2, it is seen that in the absence of a flux reversal at the $T_0$ time for each bit configuration, there will be present a flux reversal at the $T_2$ time, thus providing at least one guaranteed flux transition in each cell for self-clocking purposes regardless of the bit it configuration being written. Thus, a guaranteed flux reversal for use in self-clocking is provided which does not occur in a regular interval pattern as is illustrated in the prior art shown in FIG. 1.

Figure 3:
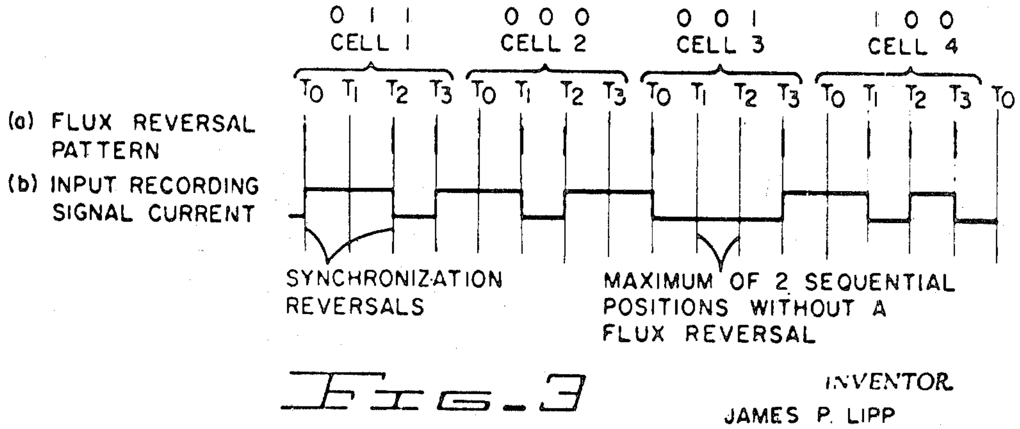
FIG. 3 is a diagram illustrating arbitrary flux patterns and reversals for various cell configurations; positions

FIG. 3(*a*) shows the flux reversal pattern which would be written onto a magnetic recording surface for the twelve bit configuration shown which is read left to right as 011, 000, 001 and 100. These twelve bits are stored in four cells with the 011 bit configuration recorded as flux reversals at $T_0$, $T_2$ and $T_3$ positions of the first cell. The 000 bit configuration is written as flux reversals at $T_1$ and $T_2$ positions of cell two, the 001 bit configuration is written as flux reversals at $T_0$ and $T_3$ positions of cell three and the 100 bit configuration is written as flux reversals at the $T_1$, $T_2$and $T_3$ positions of cell four.

With reference to FIG. 3(*b*) , the flux pattern of FIG. 3(*a*) is illustrated showing a current waveform or waveshape which is applied to the recording head winning of a transducer in order to store on a suitable medium magnetization patterns according to the invention which are representative of a train of bits selected from the bit configurations of FIG. 2. Were the current directions reversed, resulting in a waveform that is inverted compared to the one shown, an equivalent recording would result.

Synchronization reversals are illustrated in FIG. 3 at $T_0$ and $T_2$ times of cell one. As noted, a flux reversal is present at $T_2$ time for cell two and $T_0$ time for cell three. Although synchronization pulses are utilized at times $T_0$ and $T_2$, it is within the scope of this invention to utilize synchronization reversals at other cell times or at all of the cell times, if desired.

The maximum number of sequential positions without a reversal is two as shown at the $T_1$ and $T_2$ positions of cell three. While only one example is illustrated of the maximum number of sequential positions without flux reversals, any of the other combinations which may result in a maximum of two sequential positions without flux reversal may be similarly illustrated. For example, a 010 bit configuration followed by a 000 bit configuration embodies the absence of flux reversals at $T_3$ time for 010 bit configuration and at $T_0$ time for a 000 bit configuration. Thus, the present invention reduces the number of sequential positions without a flux reversal from 3 in the prior art to a maximum of 2 while still retaining the same high information density features of the prior art.

Figure 4:
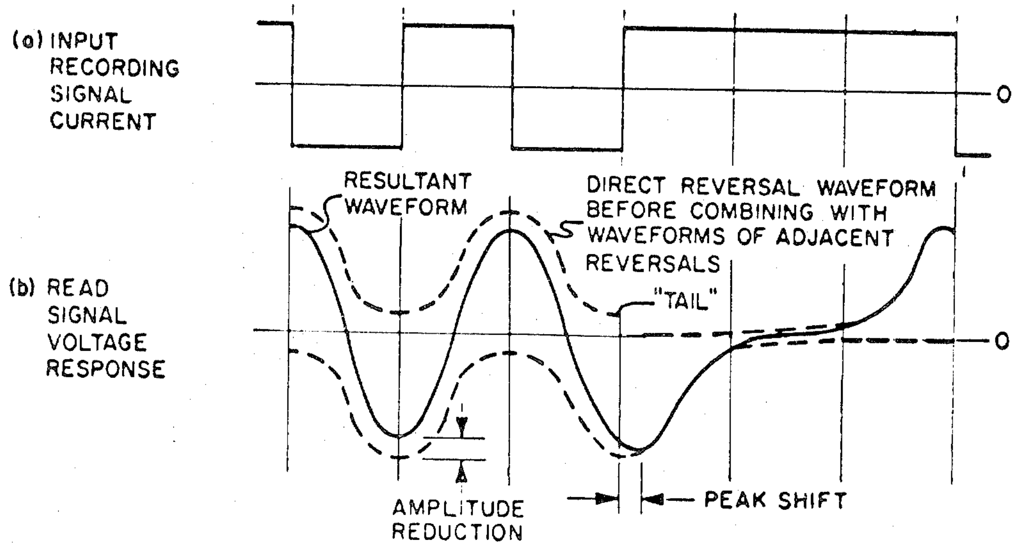
FIG. 4 is a diagram illustrating the affects of bit crowding.

FIG. 4 illustrates the pulse crowding effect heretofore mentioned and particularly shows how peak shifting and pulse amplitude are affected by a train of flux reversals.

FIG. 4(*a*) particularly illustrates a current waveform applied to a recording head winding of a transducer in order to record magnetization patterns according to the claimed invention which are representative of a train of 5 flux reversals. Assuming current flows in a positive direction when the waveform is shown above a "0" reference line and in a negative sense when shown below this reference line. FIG. 4(*b*) shows the corresponding voltage waveform which will be theoretically induced in a pickup head from a magnetization pattern produced by the waveform of FIG. 4(*a*) which is recorded on a medium being moved past the pickup head.

The dashed waveforms shown in FIG. 4(*b*) indicate isolated flux reversal voltage responses when no interference between adjacent flux reversal voltage responses are encountered in the pickup head. When adjacent voltage responses in a train of reversals interact, partial cancelling of adjacent voltage responses of opposite polarity occurs. Under this condition, a voltage response to the input current waveform shown in FIG. 4(*a*) is as shown by the continuous line waveform of FIG. 4(*b*).

FIG. 4 shows the effects of pulse of flux reversal crowding If high-density reversals are evenly spaced, a reduction in amplitude of a derived waveform having peaks representing the reversals is experienced. The reduction in amplitude is due to the negative contribution from the "tails" of adjacent pulses. If both neighboring pulses are equally spaced, symmetry effects will usually leave the center peak location relatively unshifted although the amplitude would be reduced. Further, as the density is increased, the amplitude reduction will usually become more pronounced.

With reference to FIG. 4, it is seen that if the high-density flux reversals are unevenly spaced, a closely spaced flux reversal on one side of a reference flux reversal and a widely spaced flux reversal on the other side of the reference flux reversal will result in peak shifting. This is partially caused by the changing amplitude subtracted by the nearest pulse, without being balanced by the more distant neighboring pulse. The flux reversal crowding effect is encountered in the prior art where a maximum of three sequential positions without a flux reversal results in greater peak shifting. This is particularly objectionable when recovering data by sampling the waveform at regular intervals at positions where peaks are to be detected to identify the data. The shifting of peaks therefore may result in data errors and/or clock timing jitter. The present invention reduces the maximum number of positions without a reversal from 3 to 2, thereby reducing the peak shifting effect while still retaining the greater information density of 3 data bits per cell of four reversal positions.

Figure 5:
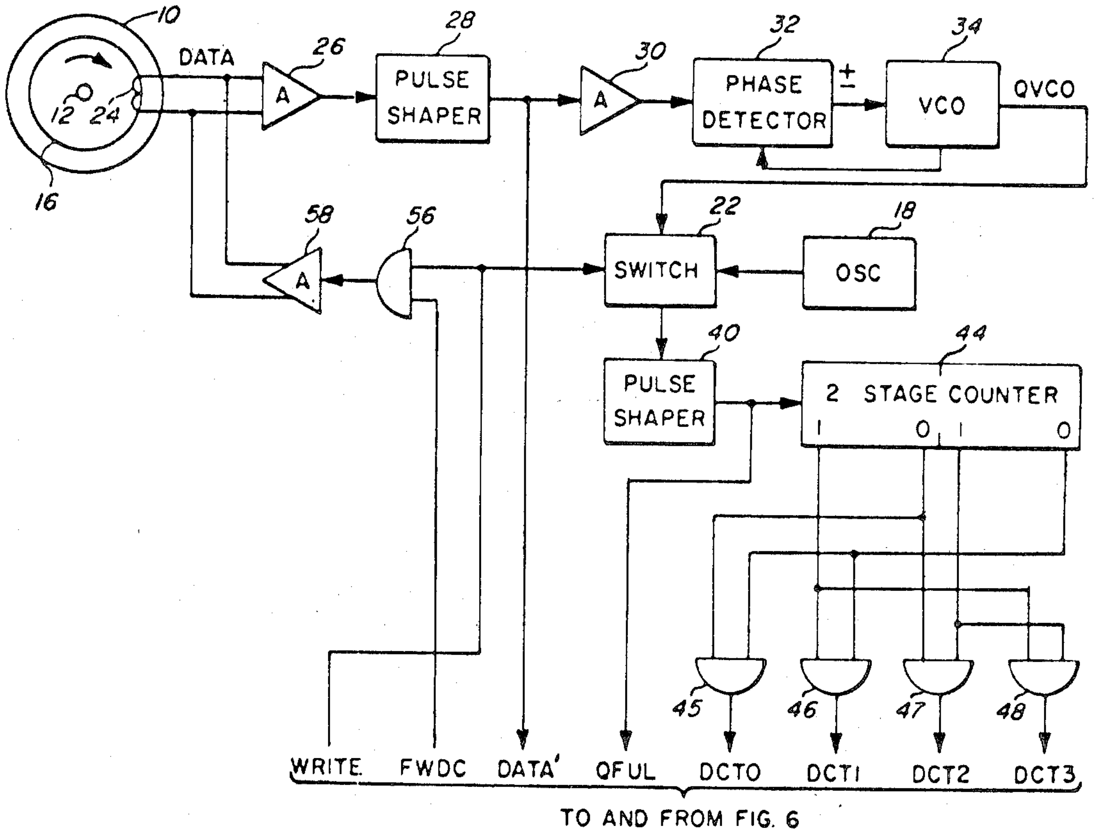
FIGS. 5 and 6 are schematic diagrams illustrating a preferred means for implementing the present invention.
Figure 6:
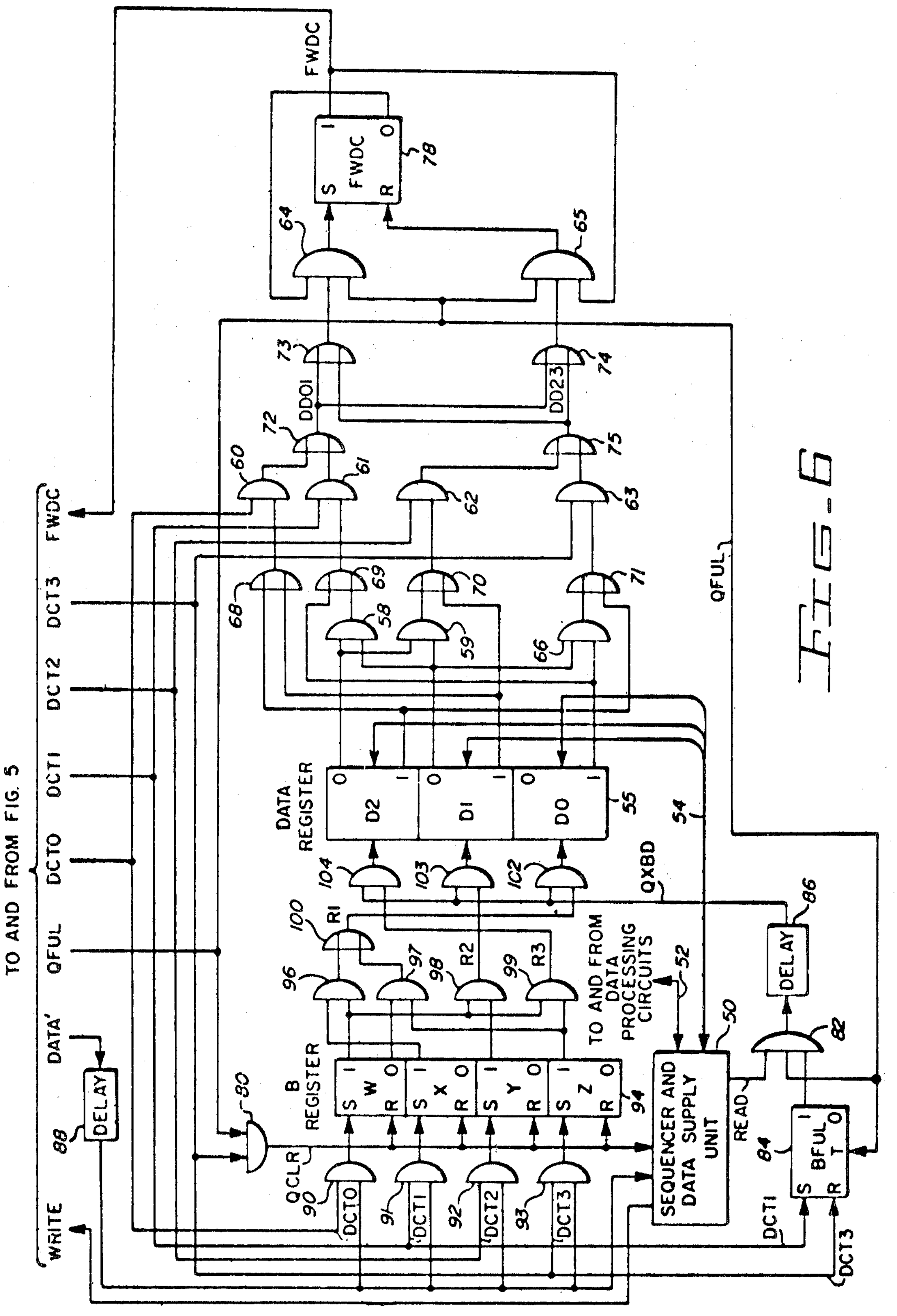
Figure 7:
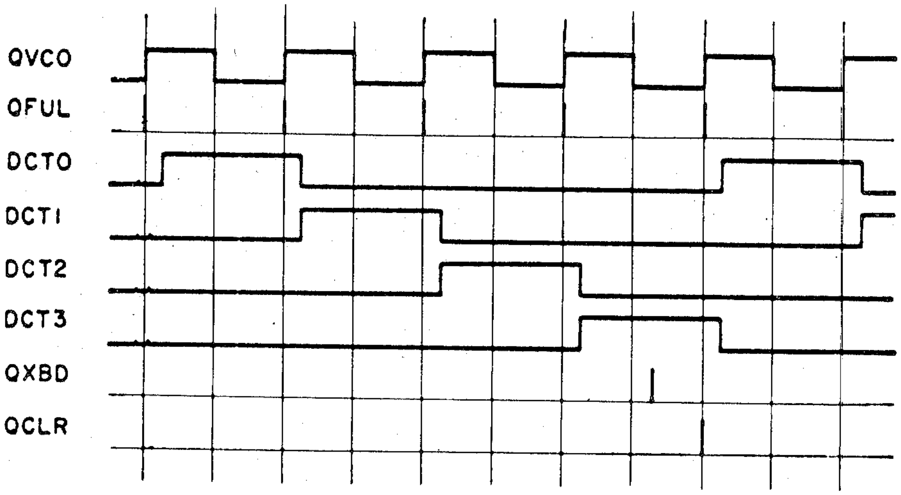
FIG. 7 is a timing diagram useful in understanding the representations of FIGS. 5 and 6.

For a more complete understanding of the invention, reference is made to the logic schematics of FIGS. 5 and 6 and their accompanying timing diagram illustrated in FIG. 7. Before beginning the explanation of these Figures, however, it is believed beneficial to briefly explain the terminology to be used. The signals to be described will be referred to as a high or enabling signal and a low or disabling signal. The logic illustrated is of conventional nature. That is, an AND-gate is a logic element which provides at its output a high or enabling signal when each of its input signals are enabling signals. An OR-gate is a multiple input logic element which provides an enabling or high output signal when one or more of its input signals is a high or enabling signal. The term flip-flop, as is used in the present description, designates a bistable multivibrator with its two stable states being a set state in which there is a binary 1 or a high or enabling signal at its one output terminal and a reset state in which there is a binary 0 or low or disabling signal at its one output terminal.

Two types of flip-flops are utilized in the present description. The first type of flip-flop has two input terminals, a S (set) terminal, and a R (reset) terminal. In this device, a high or enabling signal applied to the S terminal will place the flip-flop into its set state and a high or enabling signal applied to the R terminal will place the flip-flop into its reset state. The other type of flip-flop differs from that just described only with respect to the inclusion of a third input terminal designated T. Flip-flops thus designated are trigger flip-flops and their operation differs from that previously described in that the flip-flop will change its state only upon the application of a high or enabling signal at the T terminal simultaneously with a high or enabling signal to either of the S or R input terminals.

TIMING

In FIG. 5, a storage medium 10 in the form of a disc having a magnetizable coating is mounted for rotation in a clockwise direction about an axis 12 by a suitable drive means, not shown. An information track 16 arranged on storage medium 10 is provided for storing intelligence in the form of discrete magnetically polarized areas. A suitable transducer 24 is arranged at track 16 and serves to generate electrical signals in response to relative motion between disc 10 and transducer 24 in response to the changing magnetic polarity of discrete areas on the track. The signals thus generated are amplified by an amplifier 26 and applied to a pulse shaper 28.

Pulse shaper 28 shapes the output signals from amplifier 26 into a square waveshape form which is amplified by amplifier 30 and applied to a phase detector 32. The output signals of phase detector 32 32 are transmitted to a voltage controlled oscillator 34 whose output signals are designated QVCO. The square QVCO signals have a frequency, in the embodiment disclosed, of four times the repetition rate of the data cell occurring in the information track 16 (see FIG. 7). The output signals of the voltage controlled oscillator 34 and transmitted via a feedback loop to the phase detector 32. Phase detector 32 compares the frequency of its input signal from amplifier 30 with the output signal of the voltage controlled oscillator 34 to provide an output voltage signal, either positive or negative, representative of the difference in phase between these two signals. This output voltage signal is supplied to the voltage controlled oscillator 34 and causes the oscillator 34 to vary its output frequencies such that the output signal QVCO is in synchronism with the basic frequency of the signals being derived from the information track of disc 10. As used herein, information and data are synonymous.

The QVCO signal from oscillator 34 is transmitted to an input terminal of switch logic block 22. Another input signal transmitted to block 22 is from oscillator 18 which generates signals which are similar to those generated ky the voltage controlled oscillator 34 having a frequency, in the present example, of four times the repetition rate of the data cell occurrence.

Switch control logic block 22 performs the function of selectively switching either the signals from the voltage controlled oscillator 34 or from a precision oscillator 18 to a pulse shaper 40. During a read operation, block 22 selectively applies the signals from voltage controlled oscillator 34 to pulse shaper 40 and during a write operation applies the signals from oscillator 18 to pulse shaper 40 as hereinafter described for the read and write operations, respectively. Block 22 may, by way of example, utilize a relay operable to perform the switching operation in response to the presence or absence of a high or enabling write signal.

The QVCO signal applied by means of switch logic block 22 to pulse shaper 40, the output of which is designated as QFUL, may be seen in FIG. 7 as a train of narrow, positive going pulses occurring at the frequency rate of the QVCO signal. The QFUL signal is supplied as in input signal to a two stage counter 44 which is essentially two flip-flops in a counter configuration with the least significant bit on the left designed to step through the binary designations of zero through three. The four output terminals of counter 44 are applied as input signals to four AND-gates 45 through 48 in a manner such that the output signals of these four AND-gates, DCTO, DCT1, DCT2 and DCT3 (FIG. 6), divide the cell times into four equal parts. The signals thus far described provide the necessary timing for the writing of information onto or reading the information from disc 10.

WRITE OPERATION

During the write cycle of the disclosed embodiment, information is transmitted to a sequencer and data supply unit 50, FIG. 6, via an information bus 52 from suitable sources such as, for example, data processing circuits. This information enters the unit 50 prior to the beginning of a write cycle and contains a three, triplet, ternary or trisection bit configuration of information or data and a suitable indicating designation that this is to be a "write" operation (a write command). This information normally comes from another component within the data processing system, for example, a data processor.

In FIG. 6, unit 50 supplies the three bit configuration of data via a data bus 54 to a three bit data register 55 which acts as a temporary holding register. Because this is a write operation, unit 50 supplies a write signal to the timing logic of FIG. 5 where it is provided as one input signal to AND-gate 56 and an input signal to switch logic block 22. The write signal provided to logic block 22 provides for switching the input signal from oscillator 18 to pulse shaper 40 for deriving the timing signals DCT0, DCT1, DCT2 and DCT3. AND-gate 56 gates the write signals through an amplifier 58 to transducer 24 for writing data on disc 10.

The data register 55 is a three (triplet) register comprised of three flip-flops designated respectively, reading bottom to top, D0 through D2. Data is inserted into this register in parallel from a decoding network during the read operation and transmitted from the register to an encoding network during the write operation.

The three bits in data register 55 provide output signals from flip-flops D0 through D2 for transmittal to a plurality of AND-gates 58 through 66 and to a plurality of OR-gates 68 through 75 for controlling a write data flip-flop 78 designated as FWDC.

FIG. 2 illustrates the possible contents of the data register during succeeding periods of time when any of the 8 bit configurations 000 through 111 may be recorded. For the case when the data register contains a 000 bit configuration, the flip-flops D0 through D2 will contain binary zeros. Upon the assumption that the D1, D2 and D0 flip-flops each contain binary zeros, OR-gate 68 will be disabled. A low or disabling output signal from OR-gate 68 during the occurrence of a DCT0 signal, disables AND-gate 60 thus providing a low or disabling output signal to OR-gate 72.

The output signal DD01 from OR-gate 72 forms one of the input signals to each of OR-gates 73 and 74. The output signals from OR-gates 73 and 74 form, respectively, input signals to each of AND-gates 64 and 65. One of the terminals of each of AND-gates 64 and 65 are connected to receive the QFUL signal and also the 1 and 0 output signals of the FWDC flip-flop 78. Thus, it is seen that each time the DD01 signal is at a high or enabling level the FWDC flip-flop 78 will change its state.

The 1-output signal of FWDC flip-flop 78 is transmitted to one of the input terminals of AND-gate 56, FIG. 5. The other input signal to AND-gate 56 is the write signal from unit 50. With the enabling and disabling of AND-gate 56 by the 1-output signal of flip-flop 78, a signal is transmitted from AND-gate 56 to amplifier 58 which transmits a corresponding signal to transducer 24 to write a flux transition on data track 16 of disc 10.

For the case of a 000 bit configuration in data register 55, the DD01 signal at the output terminal of OR-gate 72 will be of a low or disabling level which is transmitted to one input terminal of each of OR-gates 73 and 74 which in turn provide low or enabling output signals to one of the input terminals of AND-gate 64 and 65. AND-gates 64 and 65 provide low or disabling output signals to the S and R input terminals, respectively, of FWDC flip-flop 78. Flip-flop 78 will not change state at the DCT0 time and a transition or flux reversal will not be written at the $T_0$ position of the data cell.

With the 000 bit configuration in data register 55, the signals at the 0-output terminals of flip-flops D1 and D2 applied to the input terminals of AND-gate 58 will both be high or enabling signals. AND-gate 58 is thereby enabled which, in turn, provides a high or enabling signal to enable OR-gate 69 for applying a high or enabling input signal to AND-gate 61. Thus, with the occurrence of a DCT1 signal at a second input terminal of AND-gate 61 conjunction occurs in AND-gate 61 and it will be enabled to provide a high or enabling signal to the two input terminals of OR-gate 72. OR-gate 72 is thereby enabled to provide a high or enabling DD01 signal to OR-gates 73 and 74. The output signals of these two OR-gate form, respectively, input signals to each of the AND-gates 64 and 65. Thus, it is seen that with a high or enabling DD01 signal and FWDC flip-flop 78 in a reset state, AND-gate 64 will be enabled and upon the occurrence of a QFUL signal a high or enabling input signal will be transmitted from AND-gate 64 to the S input terminal of flip-flop 78. Thus at a DCT1 time, flip-flop 78 will be placed in a set state, providing a high or enabling FWDC signal from its 1-output terminal for transmittal to one input terminal of AND-gate 56. With a high or enabling write signal present at a second input terminal of AND-gate 56, conjunction will occur in AND-gate 56 and a high or enabling output signal will be transmitted to amplifier 58. An output signal from amplifier 58 is then transmitted to transducer 24 to write a flux transition on the data track 16 of disc 10. This transition is written at the $T_1$ position of a data cell in which a 000 bit configuration is to be written.

With reference to FIG. 6, it is seen that the 000 bit configuration in flip-flops D1 and D2 of data register 55 provide high or enabling output signals from its 0 terminals to AND-gate 59. Thus, AND-gate 59 is enabled to provide a high or enabling signal for enabling OR-gate 70 which provides a high or enabling output signal to one input terminal of AND-gate 62. At the occurrence of a DCT2 signal, AND-gate 62 is enabled to provide a high or enabling output signal for enabling OR-gate 75 which, in turn, provides a high or enabling output signal designated DD23 to one input terminal of each of OR-gates 73 and 74. OR-gates 73 and 74 are thereby enabled to provide high or enabling output signals to each of AND-gates 64 and 65. Since the FWDC flip-flop was placed in a set state with the writing of a first flux transition, the 1-output terminal of flip-flop 78 provides a high or enabling input signal to AND-gate 65 whereby, at the occurrence of a high or enabling QFUL signal to a third input terminal of AND-gate 65, conjunction occurs and AND-gate 65 will be enabled to provide a high or enabling input signal to the R input terminal of flip-flop 78. Flip-flop 78 is thereby placed in its reset state and the change of state provides a low or disabling FWDC output signal from the 1-output terminal of flip-flop 78 to AND-gate 56 which is now disabled to provide a low or disabling output signal to amplifier 58. The output signal of amplifier 58 is then supplied to transducer 24 to thereby write a flux transition on data track 16 of disc 10. This transition is written at the $T_2$ time of a data cell in which is being written the bit configuration 000.

Flip-flop DO, shown in FIG. 6, contains a binary 0 and being in a reset state, provides a low or disabling output signal from its 1-output terminal to disable AND-gate 66, and flip-flop D1 provides a low or disabling output signal from its 0-output terminal to also disable AND-gate 66. The D2 flip-flop also contains a 0 to provide a low or disabling output signal at its 1-output terminal for transmission to one of the input terminals of OR-gate 71. OR-gate 71 was previously disabled by the output signal from disabled AND-gate 66 and thus provides a low or disabling output to one input terminal of AND-gate 63. Thus, at a DCT3 time, AND-gate 63 is not enabled and a low or disabling output signal is transmitted by it to OR-gate 75. OR-gate 75 thereby provides a low or disabling output signal to both OR-gates 73 and 74. The disabled OR-gates 73 and 74 provide low or disabling input signals to AND-gates 64 and 65 which are therefore disabled to prevent the change of the state of flip-flop 78. Since the flip-flop 78 does not change states, the FWDC output signal from its 1-output terminal will remain at a low or disabling level and will not provide for the writing of a flux transition at the $T_3$ time of the cell in which a bit configuration of 000 is to be written.

Accordingly, for a 000 bit configuration, the logic of FIGS. 5 and 6 provides for the writing of flux reversals at the $T_1$ and $T_2$ times of the cell. The encoding network provides for the writing of flux transitions at the required $T_0$ through $T_3$ positions of a data cell in a similar manner for any of the other seven bit configurations in accordance with the respective patterns of flux transitions illustrated in FIG. 2. Each successive three bit configuration written is successively transferred from unit 50 into data register 55 for recording in the manner previously described.

With reference to FIG. 7 at the end of a DCT3 time and the occurrence of the next QFUL signal, an AND-gate 80, FIG. 6, is enabled to provide a high or enabling QCLR signal to unit 50. A QCLR signal is transmitted by enabled AND-gate 80 for utilization by unit 50 to control the insertion of a new three bit configuration via a bus 52 into data register 55 in the manner previously described.

While the foregoing description of the write operation has been explained with respect to the timing initially derived from a precision oscillator, it is not, however, a requirement of the present invention. If desired, the output of a timing track on the storage medium, in this case a disc, could be utilized to initiate generation of the desired timing pulses.

READ OPERATION

The timing signals in the read operation of the present invention are generated from the data track in the manner previously described. The use of data signals for timing purposes as opposed to the oscillator previously described for the write operation is a function of switch 22.

With the initiation of a read operation, a read command received via bus 52 by unit 50 results in the generation of a read signal by unit 50. This read signal forms one signal to a three input terminal AND-gate 82, the output signal of which is applied through a suitable delay means 86 to generate a QXBD signal. This QXBD signal affects the parallel transfer of the contents of a B register 94 to the data register 55 via leads identified as $R_1$, $R_2$ and $R_3$. The QFUL signal is transmitted to a second input terminal of AND-gate 82 with its third input signal being transmitted to it from the 1-output terminal of a BFUL flip-flop 84.

The BFUL flip-flop 84 is placed into its set state by the QFUL signal at the end of the DCT1 signal, FIG. 5, and into its reset stage by the QFUL signal at the end of the DCT3 signal from counter 44. The QXBD signal from the output terminal of gate 82 is delayed by delay means 86 for a time which may be, for example, one half the DCT3 time, to permit the transfer of the decoded contents of the B register 94 to the data register 55. During DCT3 time following the entry of an information bit being read at $T_3$ position of a cell, a QXBD signal, FIG. 7, is provided at approximately one-half $T_3$ time to initiate the parallel transfer of data being read from each individual cell. The BFUL flip-flop 84 employs the QFUL signal to trigger its change of state upon the concurrence of one of the DCT1 and DCT3 signals.

In order to assure proper sampling times at $T_0$, $T_1$, $T_2$ and $T_3$ positions of each data cell, it is necessary that the incoming data from a track be preceded by a synchronizing code which may be, for example, a sequence of ones and zeros in a special pattern, followed by an address of the data which is to be read. Since the synchronization process is not material to this invention, it will not be described in detail. However, a special sequence of bit configurations are available for phasing. A special header pattern to precede data to be read may, by way of example, utilize the transition patterns of FIG. 2 corresponding to the 000, 001, 110 bit configurations in a series followed by a special or "mark" transition pattern of no transition, transition, no transition, transition. The resulting header pattern would have a series of the previously mentioned patterns corresponding to certain bit configurations followed by a series of special transitions patterns which are in turn followed by an address and subsequently preceded by data. The special transition pattern following its preamble would never appear in any phasing of a stream of data and would therefore be detected as a start transition pattern to control the start of an address reading operation.

Electrical signals indicative of the data recorded on the data track 16 of disc 10 are supplied from the pulse shaper 28 through a suitable delay means 88 to one input terminal of each of AND-gates 90 through 93. These signals are also delivered to the sequencer and unit 50 for purposes of synchronizing that unit in the manner previously described. Data from the output terminal of delay means 88 will appear as a positive going pulse with each flux reversal recorded on data track 16. The second input signals to each of AND-gates 90 through 93 are the DCT0, DCT1, DCT2 and DCT3 signals, respectively. Upon the conjunctive occurrence of a DCT0 through DCT3 signal and a data pulse corresponding to a flux reversal, a corresponding one of of flip-flops W, X, Y or Z of B register 94 is set to indicate the detection of a flux reversal at the $T_0$ through $T_3$ positions of the data cell. For example, a flux reversal in the data stream in conjunction with a DCT0 signal will enable AND-gate 90 to provide a high or enabling signal to the S input terminal of the W flip-flop of the B register 94 setting this flip-flop to indicate the presence of a flux reversal at the $T_0$ position of the data cell. In a similar manner, a flux reversal occurring at DCT1, DCT2 and DCT3 times will be detected by enabling a respective one of AND-gates 91 through 93 to set a corresponding flip-flop X, Y and Z.

Following sampling of the data to determine the presence of flux reversals at each of the $T_0$ through $T_1$ positions of a data cell, the B register 94 will contain a 4 bit configuration corresponding to the pattern of flux reversals in a data cell being read. The contents of the B register must then be decoded by a decoding network comprising AND-gates 96 through 99 and OR-gate 100. The contents of the B register will contain a pattern of ones and zeros corresponding to the flux reversal pattern of a cell read which may be, by way of example, the 000 bit configuration illustrated in FIG. 2 which would correspond to the register flip-flops X and Y being in a set state and the W and Z flip-flops being in a reset state. A low or disabling output signal from the 1-output terminal of the W flip-flop is applied to AND-gates 98 and 99 which disable AND-gates 98 and 99 for providing low or disabling $R_2$ and $R_3$ output signals from these gates.

The 1-output terminals from the W and Z flip-flops provide low or disabling signals to AND-gates 96 and 97 which are disabled to in turn disable OR-gate 100 to provide a low or disabling $R_1$ output signal.

During the occurrence of a DCT3 signal and the entry of the flux reversal indications into the B register, FIG. 6, it is required that the contents of the B register 94 by decoded and the output signals existing on lines $R_1$ through $R_3$ be entered in parallel into flip-flops D0 through D2 of data register 55. The QXBD signal from the output terminal of AND-gate 82 and delay means 86, as previously described, is provided for transmitting a high or enabling output signal to one input terminal of each of AND-gates 102, 103 and 104. Gates 102–104 are thereby selectively enabled in accordance with the presence of high or enabling signals on respective ones of leads $R_1$, $R_2$ and $R_3$, transmitted to the other input terminals of AND-GATES 102–104 to provide high or enabling signals representing the decoded contents of the B register 94 for entrance into the data register 55.

Similarly, the states of B register flip-flops W, X, Y and Z at the completion of each reading of flux reversals in a cell, corresponding to the bit configurations illustrated in FIG. 2, will be decoded by the decoding gates and entered into the data register 55.

After the entry of the decoded contents of the B register into the data register, the B register is cleared by placing the W, X, Y and Z flip-flops in a reset state prior to the occurrence of the next DCT0 signal. This is accomplished at the end of the DCT3 time when the QCLR signal is provided by AND-gate 80 at the time illustrated in FIG. 7. At the conjunctive occurrence of the QFUL signal and the DCT3 signal, AND-gate 80 is enabled to provide a high or enabling QCLR signal which is simultaneously applied to each of the R input terminals of flip-flops W, X, Y and Z of B register 94 for placing each of the flip-flops in a reset state prior to the occurrence of the next DCT0 signal.

At the occurrence of each succeeding DCT0 signal, the reading of a next data cell is initiated and the corresponding flux reversal pattern of indications will be entered into the B register and transferred to the data register from which the contents of the data register are available for transfer by means of data bus 54 to sequencer and data supply unit 50. Sequencer and data supply 50 may, by way of example, upon detecting the QCLR signal, provide for the further transfer of the received contents of data register 55 to the data processing circuits by means of bus 52.

Figure 8:
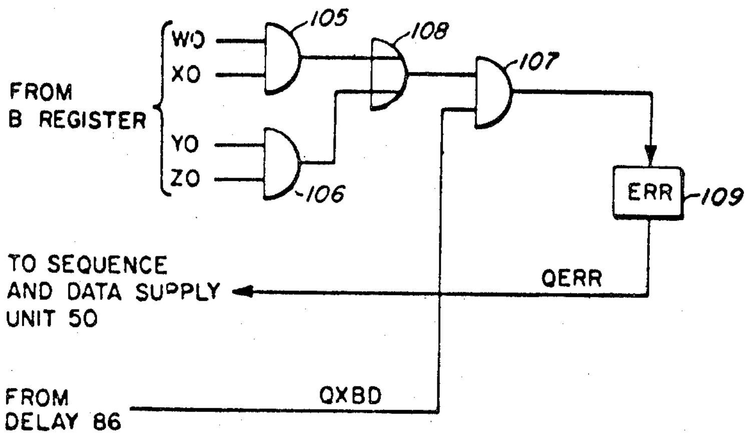
FIG. 8 is a schematic diagram for detecting certain unacceptable flux patterns which may be connected as indicated to the schematic diagram shown in FIG. 6.

Because eight possible information patterns and one special transition pattern will occur in normal operation, there exists seven other patterns of 4 bits. Any of the seven, however, would not occur in normal operation and would represent error conditions were they so detected. All seven error patterns have the common property that either register 94 stages W and X will both contain the nonreversal "0" states, or that stages Y and Z will both be in the "0" states. Hence, complete error detection of these spurious patterns will occur when AND-gate 105, shown in FIG. 8, is enabled or the AND-gate 106 is enabled by the error patterns previously described. If either circumstance should occur, OR-gate 108 would be enabled thereby actuating the error detection device 109 which would deliver an inhibiting signal to the sequencer and data supply unit 50 which in turn signals the data processing circuits via bus 52. Resultant actions, at the option of the system designer, would be to continue data readout and to warn user that an error has been detected to to inhibit further readout and to actuate an alarm or to cause the present readout to be aborted and to automatically reread the questionable portion until it is read without error indication or that a predetermined number of rereads have been accomplished.

Synchronization is provided by the data as data is being read as a result of the logic block VCO 34, FIG. 5, receiving a guaranteed flux reversal in at least one position of each cell, namely in the $T_0$ or $T_2$ cell positions such that uniform timing is obtained. The irregular occurrence of a reversal in each of these cell positions is thereby provided at sufficiently frequent intervals of time to maintain synchronization of the timing signal and in accordance with the bit configurations of FIG. 2, the number of sequential positions without a flux reversal never exceeds two. As an option, $T_1$ and $T_3$ cell flux reversals may also be used for additional samples to the timing circuits.

Thus, in accordance with the invention claimed, a new and improved high density recording code and system for implementing it is provided in which timing transitions are irregularly recorded while reducing the distances between flux reversals of the recorded data to two data recording positions or less. Pulse crowding and particularly the effects of peak shifting is greatly reduced from that obtained by use of the prior art. Accordingly, increased recording density is obtained.

While the principles of the invention have now been made clear in an illustrative embodiment, there will be immediately obvious to those skilled in the art many modifications of structure, arrangements, proportions, the elements, materials, and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

What is claimed is:

1. A system for recording self-clocking binary information as transitions in a recording medium along a track, comprising: a register operable to store a triplet of binary digits successively, and means responsive to each succeeding triplet of digits in said register to record a pattern of presences and absences of transitions corresponding to the triplet of digits in said register in the next four successive transition positions in said track following the four transition positions in which the pattern representing the preceding triplet of binary digits stored in said register is recorded in a manner such that no more than two sequential transition positions occur without a transition, whereby different combinations of presences and absences of transitions in four successive positions correspond to different triplets of binary digits, respectively.

2. The combination set forth in claim 1 wherein said transitions are flux transitions.

3. A system for recording self-clocking binary information in a magnetic track, comprising: a recording head bistable means having a first stable state and a second stable state and operable to energize said head to record flux of one polarity when in said first stable state and to record flux of the opposite polarity when in said second stable state, a register to store a triplet of binary digits, means to advance successive triplets of binary digits into said register, and means responsive to each succeeding triplet of binary digits stored in said register to cause said bistable means to switch between its opposite states to cause said recording head to record a pattern of presences and absences of flux transitions in the next four successive positions in said magnetic track following the four transition positions in which the pattern representing the preceding triplet of digits stored in said register is recorded, so that different combinations of flux transitions in four successive positions correspond to different triplets of binary digits, respectively, and the pattern of flux transitions corresponding to each triplet of binary digits being selected so that no more than two sequential transition positions occur without a flux transition in said track.

4. A system for recording self-clocking binary information in a magnetic track, comprising: a recording head, bistable means having a first stable state and a second stable state and operating to energize said head to record flux of one polarity when in said first stable state and to record flux of the opposite polarity when in said second stable state, a register to store a triplet of binary digits, means to advance successive triplets of binary digits to said register, and means responsive to the binary digits stored in said register to cause said bistable means to switch between its opposite states to said recording head to record flux transitions in at least two of four successive positions in said magnetic track in response to one triplet of binary digits in said register, to record flux transitions in at least two of four successive positions in the next four successive positions for a different triplet of binary digits, in any given four successive positions a flux transition occurring in at least one of two predictable positions, whereby said pattern of flux transitions for each four successive positions being selected so that no more than two sequential transposition positions occur without a transition in the recording of binary information along said track.

5. The system set forth in claim 4 wherein said two predictable positions being the first and third positions of said given four positions.

6. A method of recording binary information as transitions in a recording medium along a track, comprising: dividing the binary information into trisections of binary digits, and recording different patterns of presences and absences of transitions in four successive transition positions along said track to represent the different trisections of binary digits with the pattern representing each successive trisection of bits being recorded in the next four successive transition positions following the four transition positions in which the pattern representing the preceding trisection of binary digits is recorded, said patterns being selected so that no more than two sequential transition positions occur without a transition in the recording of said binary information along said track.

7. The method set forth in claim 6 wherein said binary information is recorded in a magnetic track as magnetic flux transitions.

8. A method of recording binary information as transitions in a recording medium along a track comprising: dividing the information to be recorded into groups of binary digits, and recording different patterns of presences and absences of transitions in successive transition positions along said track to represent the different groups of binary digits with the pattern representing each successive group of digits being recorded in the next succeeding set of transition positions along said track following the set of transition positions in which the pattern representing the preceding group of binary digits is recorded, said patterns being selected so that the number of transition positions in each pattern representing a group of binary digits is one greater than the number of digits per group, and so that no more than two sequential transition positions occur without a transition in the recording of said binary information along said track.

9. A method of recording and reproducing binary information by means of transitions in a recording medium comprising the steps of: dividing the binary information to be recorded into groups of binary digits, recording different patterns of presences and absences of transitions at regularly spaced transition positions to represent different groups of digits, said patterns being selected so that the number of transition positions is less than twice the number of digits per group and so that no more than two sequential transition positions occur without a transition in the recording of said binary information, sensing the transitions recorded at the transition positions in said medium, deriving a clock signal from the transitions sensed, and deriving an information signal from the transitions sensed.

10. The method of recording and reproducing binary information set forth in claim 9 wherein clock signals are derived from the first or third transition position of each group of digits.

11. The method of recording and reproducing binary information set forth in claim 9 wherein said clock signals are derived from the third transition position of each group of digits if a flux transition does not occur in the first transition position of said group of digits.

The method of recording and reproducing binary information of claim 9 in further combination with a step for identifying when patterns recorded on said medium do not conform with the method set forth.

13. A system for recording self-clocking binary information in a magnetic track, comprising: a recording head, bistable means having a first stable state and a second stable state and operable to energize said head to record flux of one polarity when in said first stable state and to record flux of the opposite polarity when in said second stable state, a register to store a triplet of binary digits, means to advance successive triplets of binary digits into said register, means responsive to each succeeding triplet of binary digits stored in said register to cause said bistable means to switch between its opposite states to cause said recording head to record a pattern of presences and absences of flux transitions in the next four successive positions in said magnetic track following the four transition positions in which the pattern representing the preceding triplet of digits stored in said register is recorded, so that different combinations of flux transitions in four successive positions correspond to different triplets of binary digits, respectively, and the pattern of flux transitions corresponding to each triplet of binary digits being selected so that no more than two sequential transition positions occur without a flux transition in said track, and means connected to said register for identifying when patterns in said register do not conform to predetermined configurations.

* * * * *